United States Patent Office 3,269,986
Patented August 30, 1966

3,269,986
LINEAR RESINOUS POLYCARBONATES OF DIHYDROXY POLYSULFONES
Eugene P. Goldberg, Pittsfield, Mass., assignor to General Electric Company, a corporation of New York
No Drawing. Filed Oct. 4, 1956, Ser. No. 613,817
3 Claims. (Cl. 260—49)

This invention relates to aromatic carbonate resins and to a process for their preparation. More specifically, this invention relates to the production of aromatic carbonate resins characterized by alternating carbonate groups and sulfone-containing organic groups.

Many carbonate resins are known. Among these carbonate resins are those prepared by the vinyl polymerization of unsaturated carbonate esters, such as allyl carbonates, etc., those resins prepared from the ester interchange of carbonate esters with aliphatic glycols and those resins prepared by reacting dihydroxy monoaryl compounds, such as hydroquinone and resorcinol, with carbonate precursors, such as phosgene or carbonate esters. Although these known carbonates have found some uses as modifiers, plasticizers, hydraulic fluids, etc., they have never achieved industrial importance as individual thermoplastic entities because of their poor properties, for example, they are too low melting, too insoluble, or too unstable.

I have now discovered a new class of aromatic carbonate resins having outstanding physical, chemical, electrical and thermal properties. In particular, these resins are characterized by high melting points and excellent thermal-oxidative stability. An additional advantage resides in the relatively economical preparation of the compositions of this invention from readily available and inexpensive raw materials.

Briefly stated, the compositions of this invention comprise carbonate resins characterized by alternating carbonate groups and sulfone-containing organic groups bonded to each other, each sulfone-containing organic group having at least two aromatic carbocyclic radicals bonded to each other by means of a sulfone linkage, each carbonate group being bonded directly to a nuclear carbon of one aromatic radical of each sulfone-containing organic group.

The resinous compositions of this invention comprise recurring structural units, each of which units will generally conform to the formula (I) 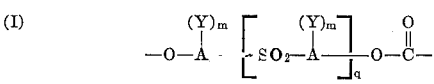

where A is the residue of an aromatic nucleus; Y is selected from the class consisting of organic and inorganic radicals, $m$ is a whole number equal to from 0 to a maximum determined by the number of replaceable nuclear hydrogens substituted on the aromatic hydrocarbon residue A, and $q$ is a whole number equal to at least one.

The compositions of this invention are generally prepared by reacting a carbonate precursor with a dihydroxy aromatic sulfone. The dihydroxy aromatic sulfone is characterized by two terminal hydroxy groups bonded to a sulfone-containing organic group, the sulfone-containing organic group having at least two aromatic carbocyclic radicals bonded to each other by means of a sulfone linkage and the terminal hydroxy groups on the aromatic sulfone being bonded directly to a nuclear carbon of the first and last aromatic radicals.

One method of preparing these resins comprises reacting (1) a dihydroxy aromatic sulfone, for example, of the formula (II) 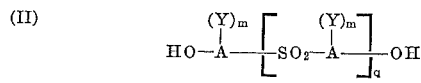

hereinafter referred to as a "dihydroxysulfone" and (2) a diaryl carbonate, for example, of the formula (III) 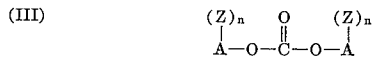

where A is the residue of an aromatic nucleus; Y and Z are inorganic or organic radicals, said radicals being inert to and unaffected by the reactants and by the reaction of the dihydroxysulfone and the diaryl carbonate; $m$ and $n$ are whole numbers equal to from 0 to a maximum equivalent to the number of replaceable nuclear hydrogens substituted on the aromatic hydrocarbon residue A; and $q$ is a whole number equal to at least one.

In the above Formula II for the dihydroxysulfone, the inert substituents designated by Y on each aromatic hydrocarbon residue may be the same or different; the number of Y's on each respective aromatic hydrocarbon nucleus residue A may also be varied if desired so that a symmetrical or an unsymmetrical compound may be formed. The Z's in the diaryl carbonate, defined by Formula III, may also be the same or different, and the number of substituents represented by Z may be the same on each aromatic nucleus A, or may vary depending upon the degree of substitution desired on each aromatic residue A.

Among the inert substituents which Y and Z may represent are, for instance, halogens (e.g., chlorine, bromine, fluorine, etc.); organoxy radicals of the formula OR, where R is a monovalent hydrocarbon radical; and monovalent hydrocarbon radicals of the type represented by R. Other inert substituents included within the scope of Y and Z, such as the nitro group, may be substituted on the aromatic nuclear residue A without departing from the scope of this invention.

Among the monovalent hydrocarbon radicals which R may represent are, for instance, alkyl radicals (e.g., methyl, ethyl, propyl, isopropyl, butyl, decyl, etc.), aryl radicals (e.g., phenyl, naphthyl, biphenyl, tolyl, xylyl, ethylphenyl, etc.), aralkyl radicals (e.g., benzyl, phenylethyl, etc.), cycloaliphatic radicals (e.g., cyclopentyl, cyclohexyl, etc.), as well as monovalent hydrocarbon radicals containing inert substituents thereon, for instance, halogens (e.g., chlorine, bromine, fluorine, etc.). Among the aromatic nuclei which A may represent are, for instance, the aromatic hydrocarbon residues based on benzene, biphenyl, naphthalene, anthracene, etc. The final configuration of this aromatic hydrocarbon residue in the molecule is determined by the nuclearly-substituted hydroxyl groups, together with any nuclearly-substituted hydrogen atoms and the number of inert substituents represented by either Y or Z.

In the above formulae, $m$ and $n$ may be zero whereby the aromatic nuclear residues A will be unsubstituted except for the hydroxyl groups in regard to Formula II, or else there may be a plurality of substitutions of inert substituents on the aromatic nuclear residues depending upon the number of nuclearly bonded hydrogens remaining on A, taking into consideration the presence of the hydroxyl groups in Formula II. Where $q$ is equal to 1, the compound of Formula II is a monosulfone. Where $q$ is greater than 1, this compound is a polysulfone.

The positions of the hydroxyl groups and of Y and Z on the aromatic nuclear residue A may be varied in the ortho, meta or para positions, and the groupings may be in a vicinal, asymmetrical, or symmetrical relationship, where two or more of the nuclearly-bonded hydrogens of the aromatic hydrocarbon residue are substituted with, for instance, Y, and the hydroxyl group in Formula II.

In general, the aromatic carbonate resins of the instant invention can be prepared by interaction between the reactants, represented by Formulas II and III above, at elevated temperatures of from about 150° C. to 300° C. or higher, for times varying from about 1 to 15 or more hours, under such conditions that an ester interchange occurs, whereby, concurrently with the heating, there is removed from the reaction mixture a composition having the formula (IV) 

where A, Z and $n$ have the meanings given above. This ester interchange evolution of the hydroxyaryl compound (represented by Formula IV) is advantageously carried out at subatmospheric pressure, for instance, at reduced pressures of around 10 to 100 mm. of mercury during the removal of the bulk of the composition represented by Formula IV. The later stage of the reaction is advantageously conducted at lower pressures of from 0.01 to 10 mm. The reaction is preferably carried out while blanketing the reaction mixture with a non-oxidizing or an inert atmosphere, such as hydrogen or nitrogen, neon, krypton, etc., to prevent undesirable oxidative effects especially under such conditions where extremely high reaction temperatures are employed under moderate sub-atmosphere pressures. The use of atmospheric and superatmospheric pressures is, however, not precluded. Heating under vacuum after the ester exchange is substantially completed (hereafter called "vacuum cooking"), for example, at from 150° C. to 300° C. at 0.01 to 10 mm. for extended periods of times, tends to increase the molecular weight and viscosity of the carbonate resin.

Although the reaction can be carried out in the absence of a catalyst, one may, if desired, use the usual ester exchange catalysts, for instance, metallic lithium, potassium, calcium, beryllium, magnesium, zinc, cadmium, aluminum, chromium, molybdenum, iron, cobalt, nickel, chromium, silver, gold, tin, antimony, lead, barium, strontium, platinum, palladium, etc., compounds thereof, such as alcoholates, oxides, carbonates, acetates, hydrides, etc. Additional catalysts and variations in the ester-exchange methods are discussed in Groggins, Unit Processes in Organic Synthesis (4th ed., McGraw-Hill Book Co., 1952), pages 616–620. The amount of such catalyst is usually quite small and is of the order of 0.001 to 0.1% or more, by weight, based on the total weight of the reactants.

Although equimolar ratios of the diaryl carbonate and the dihydroxysulfone or excesses of either reactant can be used to make the resinous compositions of the instant invention, an excess (based on molecular equivalents, hereafter called "molar excess") of the diaryl carbonate is generally preferred since the diaryl carbonate will usually have a lower boiling point than the dihydroxysulfone. The theoretical molar ratio of 1 to 1 is thus more readily achieved, permitting the development of higher molecular weights. One can employ the diaryl carbonate and the dihydroxysulfone in essentially molar equivalents or in molar concentrations which are almost equal. Molar excesses of the dihydroxysulfone can also be employed, particularly when the dihydroxy-sulfone is more volatile than the diaryl carbonate.

Although I prefer to carry out the ester interchange with diaryl carbonates, other carbonate esters can also be employed. These other carbonate esters comprise dialkyl esters (where the alkyl radicals are, for example, methyl, ethyl, propyl, butyl, hexyl, heptyl, octyl, decyl, octadecyl, etc.), dicycloalkyl esters comprising, for example, cyclopentyl, cyclohexyl, cycloheptyl, etc., and the like.

The carbonate resins can also be prepared by introducing phosgene or phosgene-like dibasic acid hailides into solutions of dihydroxysulfones in organic solvents, for example, organic bases, such as tertiary amines. Suitable dibasic acid halides, in addition to phosgene, are, for example, dibromo and diiodocarbonyls, as well as the bis-haloformates of dihydroxysulfones, such as the bis-haloformate of bis-(p-hydroxyphenyl)-sulphone. Suitable examples of tertiary amines are pyridine, quinoline, triethylamine, etc. The organic bases can be undiluted or diluted with inert polymer solvents, for example, hydrocarbons, such as benzene, toluene, xylene, etc., halocarbons, such as chloroform, chlorobenzene, carbon tetrachloride, etc., or with ketones such as acetone. The advantage of tertiary amines is that many are good solvents, they function to catalyze the reaction, and, in addition, they act as acid acceptors for the halogen acid eliminated during the reaction. Although the phosgene reaction can be carried out over a wide temperature range, such as below 0° C. to 100° C. or higher, the reaction proceeds satisfactorily at 25° C. to 50° C. Since the reaction is exothermic, the rate of phosgene addition can be used to control the temperature of the reaction. Substantially equimolar amounts of phosgene and dihydroxysulfone can be used, although an excess of up to 1.5 moles or more of phosgene may be employed. The concentration of dihydroxysulfone in solvent can also be varied within wide limits although for ease of reaction and handling, I prefer to use a solution containing from 1 to 25%, by weight, of dihydroxysulfone.

In general, the phosgene reaction is carried out by dissolving dihydroxysulfone in an organic base, such as pyridine. Phosgene is bubbled into the solution preferably at a moderate rate of addition. During the progress of the reaction, the reaction mixture is preferably stirred rapidly or agitated by other means in order to effect an efficient dispersion of the phosgene as the reaction proceeds. After the reaction is completed, the polymer is precipitated by any suitable means, for example, by pouring the reaction product into a well-stirred liquid capable of effecting precipitation, for example, hydrocarbons, alcohols, etc. The precipitation may also be carried out by addition of the non-solvent to the polymer solution. Anhydrous precipitants are preferred but water may also be used. After filtration the precipitate is washed with isopropanol or other solvent capable of removing pyridine, pyridine hydrochloride or other solvent media employed in the reaction, to yield upon drying a finely divided product.

The dihydroxysulfones may be prepared by the reaction of phenol and concentrated sulfuric acid. This method of preparation is more fully described in Glutz, Annalen, 147, 52. The dihydroxy sulfones may alternatively be prepared by subjecting polyhaloaryl sulfones such as bis-chlorophenylsulfone to the action of caustic alkali while heated. This process is more fully described in U.S. Patent 2,288,282, Huissmann, describing the preparation of 2′,4-dihydroxydiphenyl sulfone; 5′-chloro-2′,4-dihydroxydiphenylsulfone; 3′-chloro-4,4′-dihydroxydiphenylsulfone, bis(4-hydroxyphenyl)biphenyldisulfone and other similar compounds. A third method of preparation comprises the oxidation of the corresponding dihydroxysulfide or the dihydroxysulfoxide to the sulfone.

Other examples of dihydroxysulfones which may be used in the practice of this invention are the polysulfones, such as p,p′-dihydroxytriphenyl-di-sulfone. The dihalogen-substituted dihydroxysulfones may also be used, such as 3,3′-dichloro-4,4′-dihydroxydiphenylsulfone. Nitro-substituted dihydroxysulfones include 3,3′-dinitro-4,4′-dihydroxydiphenylsulfone. Alkyl-substituted dihydroxysulfones include 3,3′-dimethyl-4,4′-dihydroxydiphenylsulfone.

As a result of the above described reaction, there is obtained a linear polymer comprising structural units of the formula

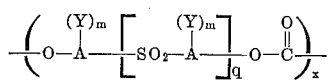

where A, Y, $m$ and $q$ have the meanings given above. During the course of the reaction, $x$ is a whole number equal to at least 1 and may grow to as high as 500 or more.

In order that those skilled in the art may better understand how the present invention may be practiced, the following examples are given by way of illustration and not by way of limitation. All parts are by weight unless otherwise stated.

*Example 1*

This example illustrates the preparation of a resin having recurring units of the formula

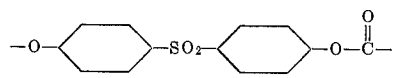

A 500 cc. resin pot equipped with a distilling head, stirrer and heating bath and connected to a vacuum system was charged with 1 part of p,p'-dihydroxydiphenylsulfone and 0.94 part of diphenyl carbonate. Heating was begun and rapid distillation of phenol occurred at a bath temperature of 250° C. and 75 mm. pressure. Distillation required about two hours during which time the bath was maintained at 230° C. and the pressure gradually reduduced to 0.1 mm. The resin was then heated at 280° C. and 0.1 to 0.3 mm. pressure for about one hour. The weight of distillate was substantially the theoretical amount. The resin had a softening point of from 270° to 300° C. and was insoluble in benzene and dioxane.

*Example 2*

This example illustrates the preparation of a resin having the same recurring structural units illustrated in Example 1, by reacting the dihydroxysulfone with phosgene.

A solution of 0.2 mole of p,p'-dihydroxydiphenylsulfone in 500 cc. of distilled and dried pyridine was introduced into a one liter reaction flask equipped with stirrer, thermometer and gas inlet tube. Phosgene was passed into the rapidly stirred solution at the rate of .40 gram/minute. The temperature rose from 22° to 32° C. during the course of the reaction. When 0.20 mole of phosgene had been added, the reaction mixture became very viscous and an additional 8 mole percent of phosgene was introduced. The polymer was precipitated with about 2 liters of isopropanol. After two washings with 2 liter portions of isopropanol, the polymer was dried at about 80° C. for 24 hours. The dry polymer was a white, granular powder which was insoluble in dioxane, chloroform, and tetrachloroethane.

In addition to the specific reactants described above, in the ester interchange method of Example 1 other diaryl carbonates may be employed. Examples of other carbonate esters comprise symmetrical carbonates, for example, di-(halo-phenyl) carbonates e.g. di-(chlorophenyl) carbonate, di-(bromophenyl) carbonate; di-(polyhalophenyl) carbonates, e.g. di-(trichlorophenyl) carbonate, di-(tribromophenyl) carbonate, etc.; di-(alkyl-phenyl) carbonates, e.g. di-(tolyl) carbonate, etc.; di-(naphthyl) carbonate, di-(chloronaphthyl) carbonate, etc.; unsymmetrical carbonates, for example, phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holliman et al., Rec. Trav. Chem. 36, 271 (1916), and Capisarow, J. Chem. Soc. (British), 1929, 251, both of whom disclose preparing dicresyl carbonate by treating the alkali metal salts of p-cresol with phosgene, and U.S. Patent 2,362,865, Tryon et al., with disclosures preparing diphenyl, ditolyl, and dinaphthyl carbonates by passing phosgene through a column of the phenol in the presence of a catalyst.

Copolymers of dihydroxysulfones are also included within the scope of this invention, e.g., carbonate resins wherein a plurality of dihydroxysulfone moieties are contained within the same carbonate resin, such as the product formed from the simultaneous reaction of mixtures of a plurality of different dihydroxysulfones with a diaryl carbonate or phosgene-like dibasic acid, etc. For example, a copolymer may be formed by reacting a mixture of unsubstituted dihydroxysulfone or corresponding polysulfone and alkyl dihydroxysulfone or corresponding polysulfone with diphenyl carbonate or phosgene.

The products of this invention have many and varied uses. Because of their high melting point they are particularly useful in electrical applications and in applications requiring solvent resistance and chemical inertness. The products of this invention can be used in molding powder formulations, either alone, or by mixing them with various fillers such as wood flour, diatomaceous earth, carbon black, silica, etc. to make molded parts such as spur, helical, worm or bevel gears, ratchets, bearings, cams, impact parts, gaskets, valve seats for high pressure oil and gas systems or other chemical fluids requiring resistance to chemicals, etc.

Films of these products prepared by calendering or extrusion (either orientated or not) are useful as metal or fiber liners, containers, covers, closures, electrical insulating tapes, in sound recording tapes, pipe coverings, etc. Because of their chemical inertness, tubing of these materials can be used to transport chemicals, such as acids and bases, which might be deleterious to other resins. Because of their chemical, physical and thermal properties, they may be used as surface coating for such apparatus as refrigerators, washing machines, cooking ovens, etc. Additional uses are as rods, wire coating, wire enamels, slot insulations in dynamoelectric machines, fibers, etc. These resins can also be employed in varnish and paint formulations and as bonding material for metallic or fibrous laminates. The carbonate resins of the present invention may be mixed with various fillers, modifiying agents, etc. such as dyes, pigments, stabilizers, plasticizers, etc.

What I claim as new and desire to secure by Letters Patent of the United States is:

1. A high molecular weight, linear, resinous polycarbonate of (1) a dihydroxy polysulfone selected from the class consisting of bis-(4-hydroxyphenyl) biphenyl disulfone and p,p'-dihydroxytriphenyl disulfone, and (2) carbonic acid.

2. A high molecular weight, linear, resinous polycarbonate of (1) bis-(4-hydroxyphenyl) biphenyl disulfone, and (2) carbonic acid.

3. A high molecular weight, linear, resinous polycarbonate of (1) p,p'-dihydroxytriphenyl disulfone, and (2) carbonic acid.

References Cited by the Examiner

UNITED STATES PATENTS

| | | | |
|---|---|---|---|
| 1,756,819 | 4/1930 | Ellis et al. | 260—47 |
| 2,035,578 | 3/1936 | Wagner | 260—62 |
| 2,210,817 | 8/1940 | Peterson | 260—77.5 |
| 2,288,282 | 6/1942 | Huismann | 260—607 |
| 2,455,653 | 12/1948 | Bralley et al. | 260—463 |
| 2,536,989 | 1/1951 | Von Glahn et al. | 260—77.5 |
| 2,595,343 | 5/1952 | Drewitt et al. | 260—47 |
| 2,789,967 | 4/1957 | Reynolds | 260—47 |

(Other references on following page)

FOREIGN PATENTS 546,375  3/1956  Belgium.
546,376  3/1956  Belgium.
546,377  3/1956  Belgium.

OTHER REFERENCES

Einhorn: Liebig's Annalen 300 (1898), pages 137, 138, 152.

WILLIAM H. SHORT, *Primary Examiner.*

LOUIS P. QUAST, MILTON STERMAN, PHILIP E. MANGAN, HAROLD BURSTEIN, *Examiners.*

G. A. DePAOLI, R. J. BUTTERMARK, R. A. BURROUGHS, *Assistant Examiners.*